United States Patent
Talbot et al.

(10) Patent No.: US 7,572,381 B2
(45) Date of Patent: Aug. 11, 2009

(54) SCALE INHIBITION IN WATER SYSTEMS

(75) Inventors: Robert Eric Talbot, Cannock (GB); Christopher Raymond Jones, Cheslyn Hay (GB); Emma Hills, Leeds (GB)

(73) Assignee: Rhodia U.K. Limited, Hertfordshire (GB)

( * ) Notice: Subject to any disclaimer, the term of this patent is extended or adjusted under 35 U.S.C. 154(b) by 358 days.

(21) Appl. No.: 10/562,710

(22) PCT Filed: Jul. 23, 2004

(86) PCT No.: PCT/GB2004/003197

§ 371 (c)(1), (2), (4) Date: Aug. 14, 2006

(87) PCT Pub. No.: WO2005/012193

PCT Pub. Date: Feb. 10, 2005

(65) Prior Publication Data

US 2007/0062879 A1    Mar. 22, 2007

(30) Foreign Application Priority Data

Jul. 23, 2003  (GB)  ................................ 0317208.7

(51) Int. Cl.
*C02F 5/14* (2006.01)
(52) U.S. Cl. ........................ 210/699; 166/279; 166/310; 210/701; 252/180; 507/237
(58) Field of Classification Search .................. 210/701
See application file for complete search history.

(56) References Cited

U.S. PATENT DOCUMENTS

| | | | | |
|---|---|---|---|---|
| 4,105,551 A * | 8/1978 | Smith et al. | .................. | 210/700 |
| 4,650,591 A * | 3/1987 | Boothe et al. | ............... | 210/700 |
| 4,681,686 A * | 7/1987 | Richardson et al. | ......... | 210/699 |
| 5,376,731 A * | 12/1994 | Kerr et al. | .................... | 525/340 |
| 5,980,776 A * | 11/1999 | Zakikhani et al. | ........... | 252/175 |
| 6,071,434 A * | 6/2000 | Davis et al. | ............... | 252/389.2 |
| 6,767,989 B2 * | 7/2004 | Davis et al. | .................. | 528/398 |
| 6,995,120 B2 * | 2/2006 | Crossman et al. | ........... | 507/227 |

FOREIGN PATENT DOCUMENTS

| | | |
|---|---|---|
| EP | 0 643 081 A1 | 3/1995 |
| EP | 0 861 846 A2 | 2/1998 |

OTHER PUBLICATIONS

International Search Report and Written Opinion of the International Searching Authority issued in PCT International Application No. PCT/GB2004/003197.

* cited by examiner

*Primary Examiner*—Peter A Hruskoci
(74) *Attorney, Agent, or Firm*—Buchanan, Ingersoll & Rooney P.C.

(57) ABSTRACT

The present invention relates to use of compositions comprising: (a) a copolymer of an unsaturated phosphonic acid (or salt of such an acid) with an unsaturated sulphonic acid (or salt of such an acid) or an unsaturated carboxylic acid (or salt of such an acid); or (b) a terpolymer of an unsaturated phosphonic acid (or salt of such an acid) with an unsaturated sulphonic acid (or salt of such an acid) and an unsaturated carboxylic acid (or salt of such an acid). These compositions are used to control the formation of scale in water systems.

15 Claims, No Drawings

SCALE INHIBITION IN WATER SYSTEMS

This application is an application under 35 U.S.C. Section 371 of International Application Number PCT/GB2004/003197 filed on Jul. 23, 2004.

This invention relates to scale inhibition in water systems.

In particular, the present invention relates to use of a composition for inhibiting the formation of scale (especially barium sulphate scale) in water systems (especially systems where the fluids are exposed to a range of temperatures, e.g. in hydrocarbon production, where temperatures are high at a sub-sea wellhead and reduce as the fluids travel to the production facility along a sub-sea tie-line). Conventionally, scale inhibitors tend to function well either at high or low temperatures, but not both.

We also claim methods for inhibiting the formation of scale in water systems by means of such compositions and to water systems so treated.

At the wellhead, fluids can often be at 100° C. or more whereas, along the tie-line, the temperature can reduce to as little as 5° C. before the fluids reach the production facility.

It is therefore vital to ensure that effective scale control is provided over the whole temperature range to which the fluids are exposed, particularly for sub-sea wells (including deep-water applications) with long tie-backs. Here, produced fluids typically travel around many tens of km along the sea-bed and in such applications, the costs of intervention, should scale occur, are high.

Previous technology has involved the use of scale inhibitors, such as phosphonates (which are maximally effective at high temperatures) and sulphonated polymers (which are maximally effective at low temperatures) but, hitherto, scale inhibitors which are fully effective at both low and high temperatures have not been available.

The present invention also relates to use of compositions to control scale deposition in systems operating under highly alkaline conditions. Such conditions are found in a variety of industrial applications, such as mineral ore extraction (e.g. heap leach processes), drilling and fracturing fluids, highly cycled process waters, alkaline bleaching systems, bottle washing systems, industrial cleaning processes, chemical pulping of wood, Kraft digesters, black liquor digesters, lime kiln gas scrubbers, evaporators, desalination systems, boiler water, cooling waters, reverse osmosis systems, etc. We also claim methods of controlling scale deposition in systems operating under highly alkaline conditions and water systems so treated.

We have now unexpectedly found that copolymers or terpolymers containing both phosphonate and sulphonate groups (with the addition in terpolymers, of carboxylate groups) can produce enhanced scale-inhibition in water systems over a range of temperatures. These copolymers and terpolymers can also provide scale formation control in systems operating under highly alkaline conditions.

In a first aspect, therefore, the present invention provides the use of a composition in a water system to inhibit the formation of scale at high (e.g. wellhead) and low (e.g. seabed) temperatures wherein the composition comprises:

(a) a copolymer of an unsaturated phosphonic acid (or salt of such an acid) with an unsaturated sulphonic acid (or salt of such an acid) or an unsaturated carboxylic acid (or salt of such an acid) or (b) a terpolymer of an unsaturated phosphonic acid (or salt of such an acid) with an unsaturated sulphonic acid (or salt of such an acid) and an unsaturated carboxylic acid (or salt of such an acid).

In particular, the scale is barium sulphate scale.

In a second aspect the present invention provides the use of a composition in a water system operating under highly alkaline conditions to control the deposition of scale wherein the composition comprises:

(a) a copolymer of an unsaturated phosphonic acid (or salt of such an acid) with an unsaturated sulphonic acid (or salt of such an acid) or an unsaturated carboxylic acid (or salt of such an acid) or (b) a terpolymer of an unsaturated phosphonic acid (or salt of such an acid) with an unsaturated sulphonic acid (or salt of such an acid) and an unsaturated carboxylic acid (or salt of such an acid).

Examples of suitable unsaturated phosphonic acids include vinylphosphonic acid (VPA) (or a salt thereof) and vinylidene-1,1-diphosphonic acid (VDPA) (or a salt thereof).

Examples of suitable unsaturated sulphonic acids include vinylsulphonic acid (VSA) (or a salt thereof), and AMPS(2-acrylamido-2-methylpropane sulphonic acid) (or a salt thereof).

Examples of suitable unsaturated carboxylic acids include acrylic acid (AA) (or a salt thereof) and methacrylic acid (MAA) (or a salt thereof).

Accordingly, the composition used in the first aspect and the second aspect of the present invention may comprise any of the following:

(i) a copolymer of VPA (or a salt thereof) and VSA (or a salt thereof), an especially-preferred copolymer being a 1:5 to 1:40, preferably 1:20, copolymer of VPA and VSA;
(ii) a copolymer of VPA (or salt thereof) and AA or MAA (or salt thereof)
(iii) a copolymer of VDPA (or a salt thereof) and AA (or a salt thereof) or MAA (or a salt thereof);
(iv) a copolymer of VDPA (or a salt thereof) and VSA (or a salt thereof)
(v) a terpolymer of VPA (or a salt thereof), AA (or a salt thereof) and VSA (or a salt thereof);
(vi) a terpolymer of VPA (or a salt thereof), MAA (or a salt thereof) and VSA (or a salt thereof);
(vii) a terpolymer of VDPA (or a salt thereof), AA (or a salt thereof) and VSA (or a salt thereof);
(viii) a terpolymer of VDPA (or a salt thereof), MAA (or a salt thereof) and VSA (or a salt thereof).

Where a salt of an unsaturated phosphonic, sulphonic or carboxylic acid is used, the salt may be a wholly-neutralised or partially-neutralised salt (for example a wholly- or partially-neutralised sodium, potassium or ammonium salt of the unsaturated acid).

In a third aspect, the present invention provides a method for inhibiting the formation of scale in a water system operating at high (e.g. wellhead) and low (e.g. seabed) temperatures, the method comprising the addition to the water system of a scale inhibiting amount of a composition described in the first aspect of the present invention hereinabove described.

Suitably, the composition is added to the water system in an amount of up to 1000 ppm, more typically 1-200 ppm.

Generally, for sub-sea applications, the seabed temperature of the water system can be as low as 5 degrees Celsius, and the wellhead temperature can be up to 200 degrees Celsius. For example, the system water temperature at the wellhead can be in the range 80-200 degrees Celsius, and the seabed temperature can be below 40 decrees Celsius, and typically as low as 5 degrees Celsius.

In a fourth aspect, the present invention provides a method for controlling the deposition of scale, preferably inhibiting the formation of scale, in a water system operating under highly alkaline conditions, the method comprising the addition to the water system of a scale deposition controlling, preferably scale inhibiting, amount of a composition as described in the second aspect of the present invention hereinabove described.

In a fifth aspect, the present invention provides a water system treated by the method according to the third or fourth aspect of the present invention hereinabove described.

Suitably, the water system so treated by a method according to the third aspect is operatively associated with an oilfield or an oil-well. Application may be by injection of the scale inhibitor into the fluid stream by means of, e.g. a dosing pump but often, application is by "squeeze" treatment whereby the scale inhibitor is forced into the oil bearing formation from whence, subsequently, it bleeds back slowly into the produced fluids thus treating them at the appropriate level to inhibit scale.

In a sixth aspect, the present invention provides use in a water system of a composition to control the deposition, preferably inhibit the formation, of scale under highly alkaline conditions wherein the composition comprises a compound of the formula:

$$X_2O_3P.CHY\ CZ_2\ PO_2X\ R \qquad (I)$$

where X is H or an alkali metal, alkaline earth or other polyvalent metal, ammonium or an organic base, and R is hydrogen, an alkyl moiety or a group, or polymeric chain comprising between 1 and 100,000 groups, said group or groups being derived from at least one unsaturated compound in which the multiple bond is activated chemically by an adjacent electron withdrawing group, and Y and Z are each hydrogen, a $PO_3X_2$, $SO_3X$ or $CO_2X$ group or an alkyl or aryl moiety.

The compounds may exist either as free acids or as their salts. They are normally prepared and used in the form of water soluble salts (e.g. alkali metal salts, especially sodium or potassium salts, or ammonium salts). References herein to the products or their precursors as acids should be construed as including references to the soluble salts where the context permits.

In formula I it may be that X is H or an alkali metal or ammonia, Y is H, each Z is H, and R is H. Alternatively it may be that X is H or an alkali metal or ammonia, Y is $X_2O_3P$—, each Z is H and R is H. As further alternative it may be that X is H or an alkali metal or ammonia, Y is H or $X_2O_3P$—, each Z is H and R is —$CH_2CHYPO_3X_2$.

The compound of formula (I) may be a telomer wherein R is a polymeric or copolymeric group formed from at least one monomer selected from unsaturated sulphonic acids, phosphonic acids, carboxylic acids and their water soluble salts.

Preferably the monomer comprises vinyl sulphonic acid and/or its water soluble salt, vinyl phosphonic acid and/or its water soluble salts, vinylidene diphosphonic acid and/or its water soluble salts or acrylic acid.

The monomer may comprise at least one member selected from methacrylic acid, maleic acid, fumaric acid, itaconic acid, mesaconic acid, citraconic acid, crotonic acid, isocrotonic acid, angelic acid, tiglic acid, vinyl alcohol, vinyl chloride, vinyl acetate, styrene sulphonic acid, 2-acrylamido-2 methylpropane sulphonic acid and their water soluble salts.

The details of manufacture of the compound of Formula (I) are found in European Patent No 0 861 846 of the applicant.

The invention will be illustrated, in a preferred embodiment, by way of the following Examples.

EXAMPLE 1

Methodology

A standard static beaker barium sulphate bottle test used in the industry was followed.

Tested inhibitors are detailed in Table 1 (below):

TABLE 1

| Inhibitor Functionality | Hereafter referred to as |
|---|---|
| VSA homopolymer | Inhibitor A |
| diethylene triamine pentakis(methylene phosphonic acid), 45% aqueous solution of sodium salt | Inhibitor B |
| phosphonate end-capped poly(acrylic acid) | Inhibitor C |
| phosphonate end-capped VSA/AA copolymer | Inhibitor D |
| VPA/VSA random copolymer | Inhibitor E |
| AA/MAA/VSA random copolymer | Inhibitor F |

Test brines were North Sea seawater and a medium-scaling formation water (Nelson). Brine formulations are given in Table 2 below. Brines were mixed in a 50:50 ratio. All brines were buffered to pH=5.5 using a 5 sodium acetate/acetic acid buffer (34 g of sodium acetate tri-hydrate and 0.75 g of concentrated acetic acid, made up to 250 ml in a volumetric flask with distilled water). All brines were filtered through a 0.45 μm filter before use (to remove potential nucleation sites).

TABLE 2

Composition of brines used in static barium sulphate inhibition efficiency tests

| Salt | Seawater g/l | Synthetic Nelson formation water g/l |
|---|---|---|
| NaCl | 24.41 | 79.50 |
| $CaCl_2 \cdot 6H_2O$ | 2.34 | 10.93 |
| $MgCl_2 \cdot 6H_2O$ | 11.44 | 6.18 |
| KCl | 0.877 | 1.25 |
| $BaCl_2 \cdot 2H_2O$ | — | 0.48 |
| $SrCl_2 \cdot 6H_2O$ | — | 2.35 |
| $Na_2SO_4$ | 3.98 | — |

Inhibitor stock solutions of 1000 ppm (in seawater) were diluted to give 20 ppm, 30 ppm and 40 ppm stocks in seawater. Two aliquots of 100 mls of each stock were placed in two 100 ml Azlong plastic bottles (test in duplicate). Two sets of blanks were also prepared containing seawater (minimum barium blank) and distilled water (maximum barium blank). Into an equivalent number of 250 ml Azlong bottles were placed 100 mls of formation water and 2 mls of buffer. All seawater bottles were placed in a refrigerator at 5° C. and all formation water bottles were placed in a pre-cooled water bath at 5° C. Bottles were kept for 2 hours at that temperature. The seawater was then added to the formation water and the bottles replaced in the water bath at 5° C. This gave final inhibitor test doses of 5, 10 and 15 ppm inhibitor. Bottles were sampled after 2 and 22 hours. These sampling times represent scale inhibition by nucleation inhibition and crystal growth inhibition mechanisms respectively. A 1 ml sample was taken from each bottle (taking care not to pick up any deposited scale). This was injected into a plastics test tube containing 9 mls of a pre-prepared quench solution (28.559 g of KCl, 5 g of polyvinylsulphonic acid in distilled water, adjusted to pH+8.0-8.5 with NaOH and made up to 5 liters in a 5 liter volumetric flask). Each sample was analysed for residual barium by ICP analysis.

The barium sulphate inhibition efficiency was then calculated as follows:

$$\% \text{ efficiency} = \frac{[Ba^{2+} \text{ in sample}] - [Ba^{2+}]min}{[Ba^{2+}]max - [Ba^{2+}]min} \times 100$$

$[Ba^{2+}]max = Ba^{2+}$ content of maximum($FW/H_2O$)blank $[Ba^{2+}]min = Ba^{2+}$ content of minimum($FW/SW$)blank The results are shown in tabular form in Table 3 (below) and in graphical form in the accompanying drawing.

TABLE 3

| Inhibitor | % Ba efficiency 2 hours | | | 22 hours | | |
|---|---|---|---|---|---|---|
| | 5 ppm | 10 ppm | 15 ppm | 5 ppm | 10 ppm | 15 ppm |
| A | 41 | 53 | 81 | 6 | 14 | 24 |
| F | 33 | 65 | 90 | 11 | 16 | 25 |
| B | 30 | 24 | 16 | 2 | 2 | 1 |
| C | 28 | 69 | 78 | 10 | 19 | 25 |
| E | 65 | 92 | 104 | 15 | 33 | 55 |
| D | 21 | 59 | 77 | 11 | 22 | 39 |

The results show the enhanced scale inhibiting properties of a copolymer of VPA and VSA in comparison with other sulphonate polymers.

EXAMPLE 2

Mains water (102 ppm Calcium hardness, 136 ppm total hardness, 85 ppm total alkalinity (all expressed as CaCO3) and pH 8) was adjusted to pH 11 using saturated calcium oxide/hydroxide solution and the efficacy of a selection of inhibitors to control scaling was evaluated over a 24 hour period at dose levels of 10 and 50 ppm product.

HACH NTU and soluble calcium measurements were used to determine the efficacy of the inhibitors. The results are summarised in Table 4.

TABLE 4

| Product | ppm dosage (as solids) | % Inhibition |
|---|---|---|
| Blank | 0 | 0 |
| Phosphonate scale inhibitor* | 5 | 76 |
| Phosphonate scale inhibitor* | 25 | 85 |
| Inhibitor D | 2.5 | 85 |
| Inhibitor D | 12.5 | 100 |

*(2-hydroxyethyl) iminobis(methylenephosphonic acid)

The results clearly demonstrate the ability of Inhibitor D to control scale deposition at pH 11 under stressed conditions.

Inhibitor D is as referred to in Table 1, a copolymer of acrylic acid and vinylsulphonic acid, with a terminal vinylidine diphosphonic acid group.

The invention claimed is:

1. A process to inhibit the formation of scale in a water system at both wellhead and seabed temperatures comprising a step of adding to the water system a scale inhibiting amount of a composition comprising:
    (a) a copolymer of an unsaturated phosphonic acid or a salt of such an acid with an unsaturated sulphonic acid or a salt of such an acid or an unsaturated carboxylic acid or a salt of such an acid; or
    (b) a terpolymer of an unsaturated phosphonic acid or a salt of such an acid with an unsaturated sulphonic acid or a salt of such an acid and an unsaturated carboxylic acid or a salt of such an acid,
    wherein the system water temperature at a wellhead is in the range of 80-200° C. and a seabed temperature is below 40° C., and
    wherein the formation of scale in the water system is inhibited at both the wellhead and seabed temperatures.

2. The process according to claim 1, wherein the composition comprises a copolymer of vinylphosphonic acid or a salt thereof and vinylsulphonic acid or a salt thereof.

3. The process according to claim 1, wherein the composition comprises a 1:20 copolymer of vinylphosphonic acid and vinylsulphonic acid.

4. The process according to claim 1, wherein the composition comprises a copolymer of vinylhosphonic acid or a salt thereof and acrylic acid or a salt thereof or methacrylic acid or a salt thereof.

5. The process according to claim 1, wherein the composition comprises a copolymer of vinylidene-1,1-diphosphonic acid or a salt thereof and acrylic acid or a salt thereof or methacrylic acid or a salt thereof.

6. The process according to claim 1, wherein the composition comprises a copolymer of vinylidene-1,1-diphosphonic acid or a salt thereof and vinylsulphonic acid or a salt thereof.

7. The process according to claim 1, wherein the composition comprises a terpolymer of vinylphosphonic acid or a salt thereof, acrylic acid or a salt thereof and vinylsulphonic acid or a salt thereof.

8. The process according to claim 1, wherein the composition comprises a terpolymer of vinylphosphonic acid or a salt thereof, methacrylic acid or a salt thereof and vinylsulphonic acid or a salt thereof.

9. The process according to claim 1, wherein the composition comprises a terpolymer of vinylidene-1,1-diphosphonic acid or a salt thereof, acrylic acid or a salt thereof and vinylsulphonic acid or a salt thereof.

10. The process according to claim 1, wherein the composition comprises a terpolymer of vinylidene-1,1-diphosphonic acid or a salt thereof, methacrylic acid or a salt thereof and vinylsulphonic acid or a salt thereof.

11. The process according to claim 1, wherein in the composition the salt of the phosphonic acid, sulphonic acid or carboxylic acid is a wholly-neutralised or partially-neutralised salt.

12. The process according to claim 11, wherein the salt is a sodium salt, a potassium salt or an ammonium salt.

13. The process according to claim 1, wherein the amount of the composition is up to 1000 ppm.

14. The process according to claim 1, wherein the water system is operatively associated with an oilfield or oil-well.

15. The process according to claim 1, wherein the amount of the composition is from 1 ppm to 200 ppm.

* * * * *